(12) United States Patent
Dalan

(10) Patent No.: US 11,679,832 B2
(45) Date of Patent: Jun. 20, 2023

(54) APPARATUS FOR SECURING A BACKPACK TO A BICYCLE PANNIER

(71) Applicant: Kyle Donald Dalan, Richland, WA (US)

(72) Inventor: Kyle Donald Dalan, Richland, WA (US)

(*) Notice: Subject to any disclaimer, the term of this patent is extended or adjusted under 35 U.S.C. 154(b) by 0 days.

(21) Appl. No.: 17/893,731

(22) Filed: Aug. 23, 2022

(65) Prior Publication Data

US 2023/0111464 A1  Apr. 13, 2023

Related U.S. Application Data

(60) Provisional application No. 63/254,505, filed on Oct. 11, 2021.

(51) Int. Cl.
| | |
|---|---|
| *B62J 7/08* | (2006.01) |
| *B62J 7/04* | (2006.01) |
| *B62J 9/27* | (2020.01) |
| *B62J 9/23* | (2020.01) |

(52) U.S. Cl.
CPC . *B62J 7/08* (2013.01); *B62J 7/04* (2013.01); *B62J 9/23* (2020.02); *B62J 9/27* (2020.02)

(58) Field of Classification Search
CPC .................. A45F 3/12; A45F 2003/001; A45F 2003/003; B62J 9/23; B62J 9/27; B62J 9/04; B62J 7/08
See application file for complete search history.

(56) References Cited

U.S. PATENT DOCUMENTS

| | | | |
|---|---|---|---|
| 5,435,471 A | 7/1995 | Chuang | |
| 5,673,833 A | 10/1997 | Ortlieb | |
| 6,702,505 B1 | 3/2004 | Nutto et al. | |
| 7,766,201 B2 | 8/2010 | Chuang | |
| 8,292,139 B2 | 10/2012 | Golub et al. | |
| 10,486,004 B1* | 11/2019 | Solis, Jr. | ............... F16L 3/1075 |
| 2020/0329850 A1* | 10/2020 | Haack | ...................... A45C 5/14 |

\* cited by examiner

*Primary Examiner* — Corey N Skurdal
(74) *Attorney, Agent, or Firm* — Dale J. Ream

(57) ABSTRACT

An apparatus for securing a shoulder strap of a backpack to a bicycle luggage rack includes a first capture member and a second capture member opposite and facing the first capture member with each having an elongate, linear configuration and having opposed ends. Respective ends of the capture members may be selectively coupled together with a pair of fasteners and selectively loosened or tightened such that the capture members are displaced from one another at the loosened configuration and are compressed toward one another at the tightened configuration so as to sandwich the backpack strap therebetween. An attachment portion, such as a clip, is attached to a backside of the first capture member and configured to removably attach to a bicycle luggage rack.

12 Claims, 6 Drawing Sheets

APPARATUS FOR SECURING A BACKPACK TO A BICYCLE PANNIER

CROSS REFERENCE TO RELATED APPLICATIONS

This application is a non-provisional utility patent application that claims the priority of provisional patent application Ser. No. 63/254,505 filed Oct. 11, 2021 titled BACKPACK STRAP PANNIER HOOK, which is herein incorporated by reference in its entirety.

BACKGROUND OF THE INVENTION

This invention relates generally to bag attachment devices and, more particularly, to an apparatus for selectively securing a strap or straps of a backpack to a bicycle luggage carrier, a.k.a. bicycle rack, booking carrier, or pannier.

Tying or strapping one's books to the luggage carrier or book rack of one's bicycle before writing to class is well known. Whether walking to school or riding a bicycle, a traditional student takes home and returns to school with more books, writing utensils, and project materials as can be comfortably transported. In fact, the prior art is replete with products and patents that profess new and better means for attaching materials to a bicycle luggage rack or even for novel bicycle racks themselves.

Although presumably effective for their intended purposes, the existing devices do not provide a device or apparatus that may be semi-permanently attached to a strap of a backpack and that may be quickly and securely coupled to or removed from a bicycle luggage carrier, i.e., a pannier, without any manipulation of straps, cords, or any particular aspect of the backpack.

Therefore, it would be desirable to have an apparatus that may be semi-permanently coupled to a strap of a backpack and then directly clipped and secured to a bicycle rack without resort to external attachment devices or any part of the backpack itself. Further, it would be desirable to have an apparatus having a pair of spaced apart capture members that may be semi-permanently clamped to or sandwiched about an arm strap of a backpack and an attachment member configured to quickly connect to or be removed from a bicycle luggage rack.

SUMMARY OF THE INVENTION

An apparatus for securing a shoulder strap of a backpack to a bicycle luggage rack according to the present invention includes a first capture member and a second capture member opposite and facing the first capture member with each having an elongate, linear configuration and having opposed ends. Respective ends of the capture members may be selectively coupled together with a pair of fasteners and selectively loosened or tightened such that the capture members are displaced from one another at the loosened configuration and are compressed toward one another at the tightened configuration, so as to sandwich the backpack strap therebetween. An attachment portion, such as a clip, is attached to a backside of the first capture member and configured to removably attach to a bicycle luggage rack.

Therefore, a general object of this invention is to provide an apparatus for securing a shoulder strap of a backpack to a bicycle luggage rack that may be semi-permanently coupled to a shoulder strap of a backpack and that includes a quick connect clip for attaching the apparatus (backpack and all) to the luggage rack.

Another object of this invention is to provide an apparatus for securing a shoulder strap of a backpack to a bicycle luggage rack, as aforesaid, in which the shoulder strap capturing portion is integrally constructed with the luggage rack attachment portion.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale taken from FIG. 2a;

FIG. 3b is a reverse perspective view of the apparatus shown in FIG. 3a;

FIG. 4b is a side view of the apparatus shown in FIG. 4a;

FIG. 4c is a front view of the apparatus as in FIG. 4a;

FIG. 5a is an exploded view of the apparatus as in FIG. 4a;

FIG. 5b is an exploded view taken from a lower elevation of the apparatus as in FIG. 5a;

DESCRIPTION OF THE PREFERRED EMBODIMENT

Figure 1:
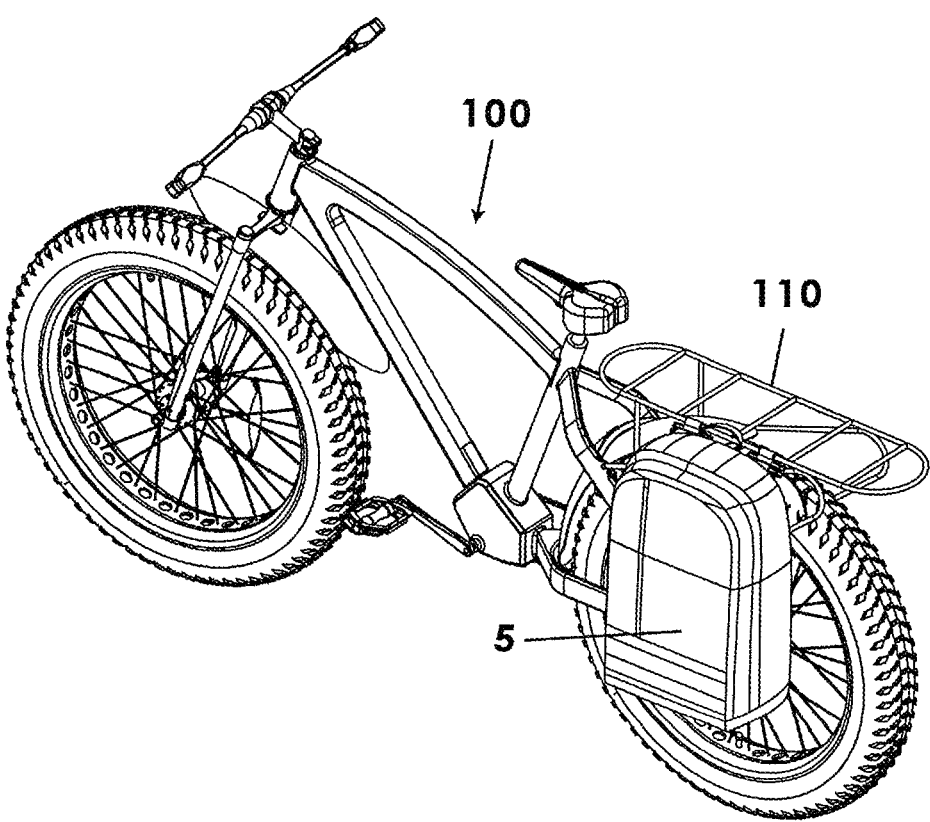
FIG. 1 is a perspective view of an apparatus for securing a backpack to a bicycle luggage rack according to a preferred embodiment of the present invention.
Figure 2A:
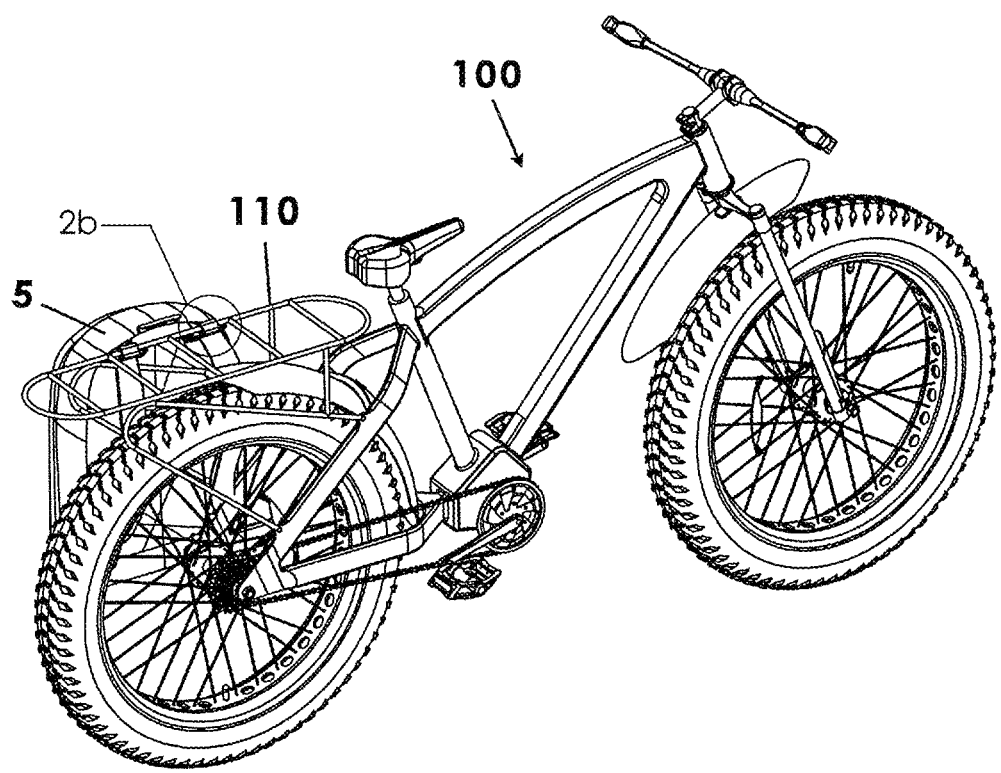
FIG. 2a is a perspective view from a reverse angle of the apparatus as in FIG. 1.
Figure 2B:
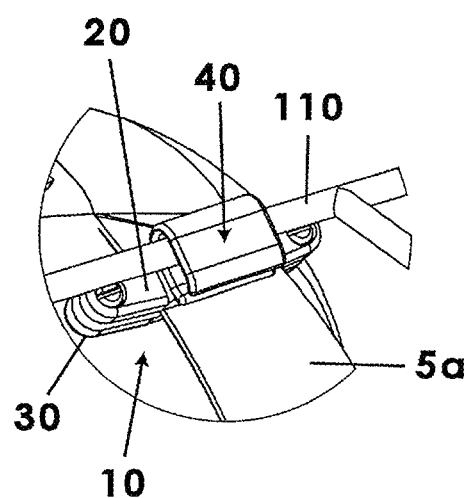
Figure 3A:
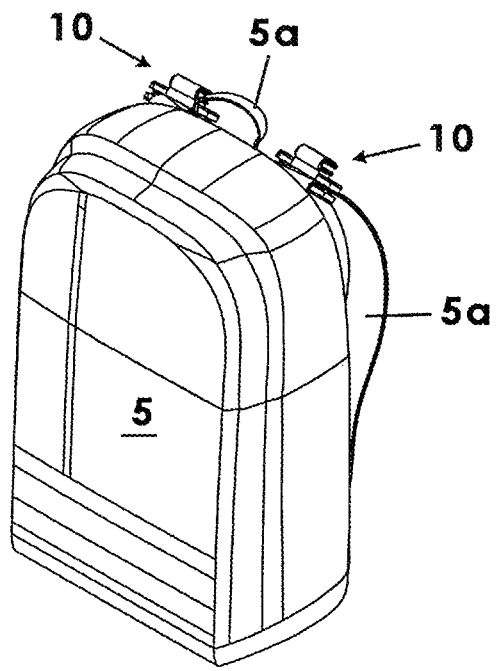
FIG. 3a is a perspective view of the apparatus for securing a backpack removed from the bicycle shown in FIG. 1.
Figure 3B:
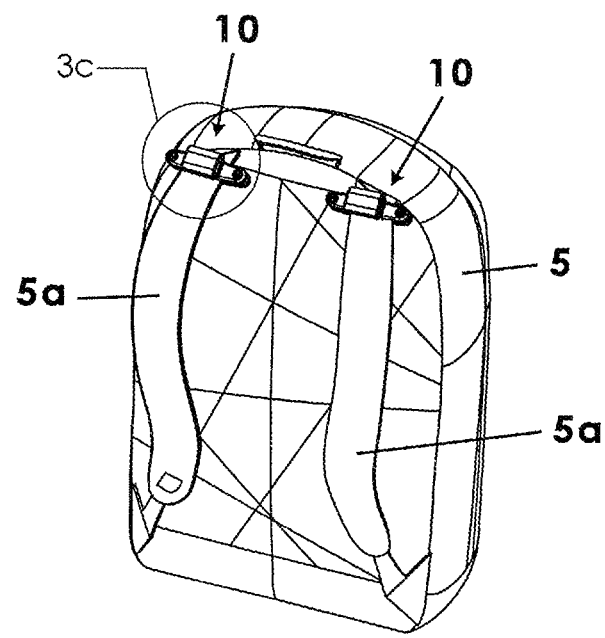
Figure 3C:
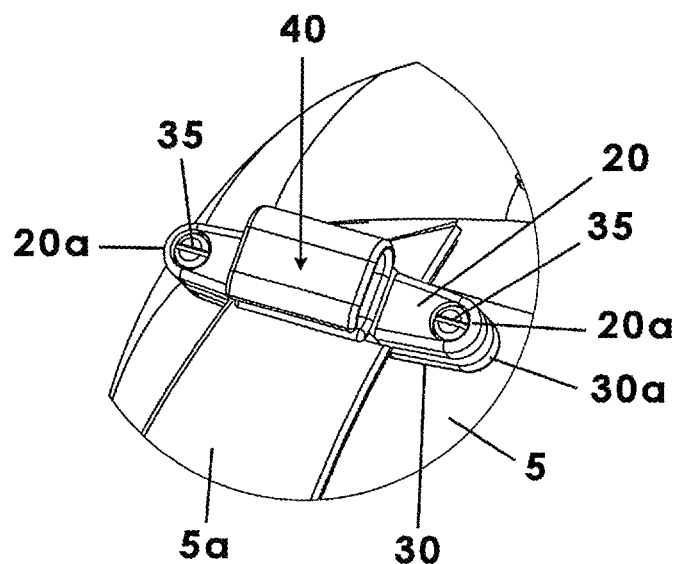
FIG. 3c is an isolated view on an enlarged scale taken from FIG. 3b.
Figure 4A:
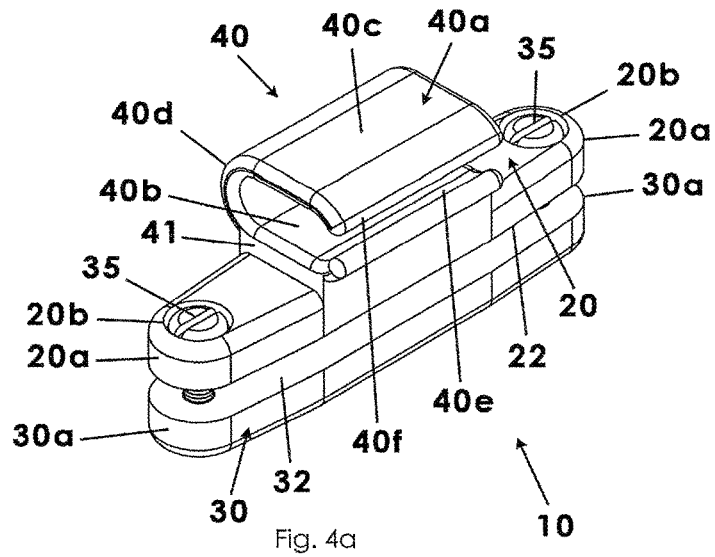
FIG. 4a is a perspective view of the apparatus for securing a backpack illustrated removed from both the bicycle and backpack according to the preferred embodiment of the present invention.
Figures 4B, 4C:
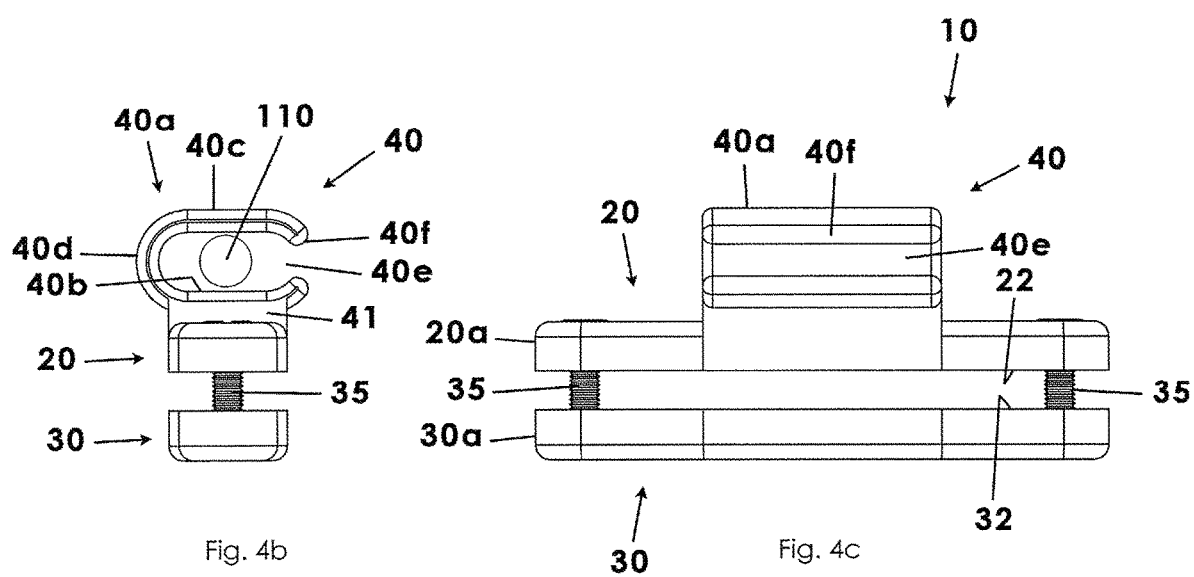
Figure 5A:
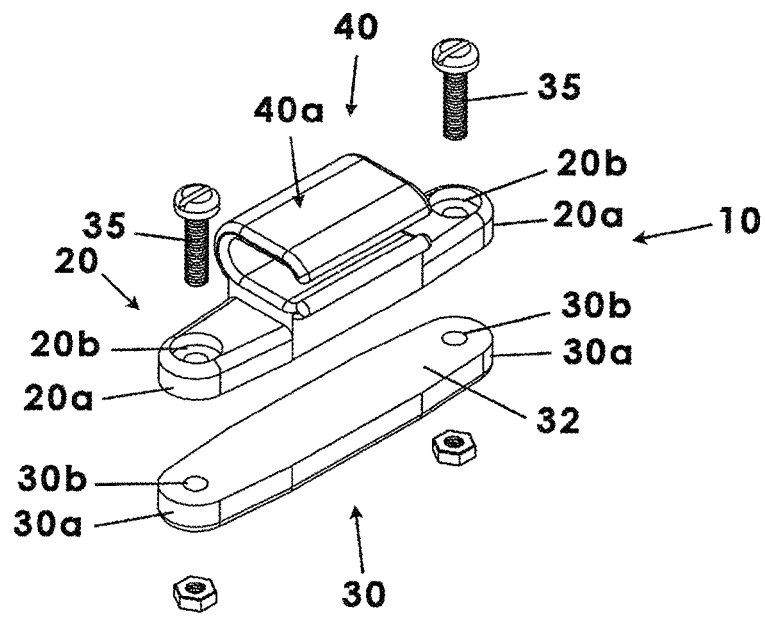
Figure 5B:
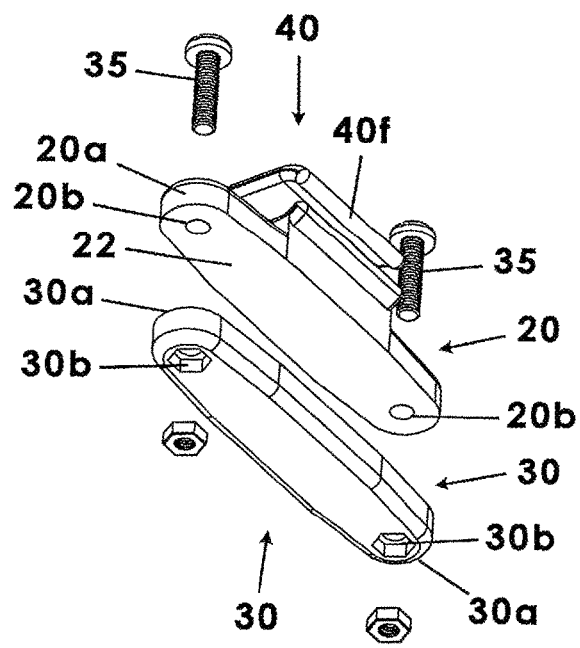
Figure 6A:
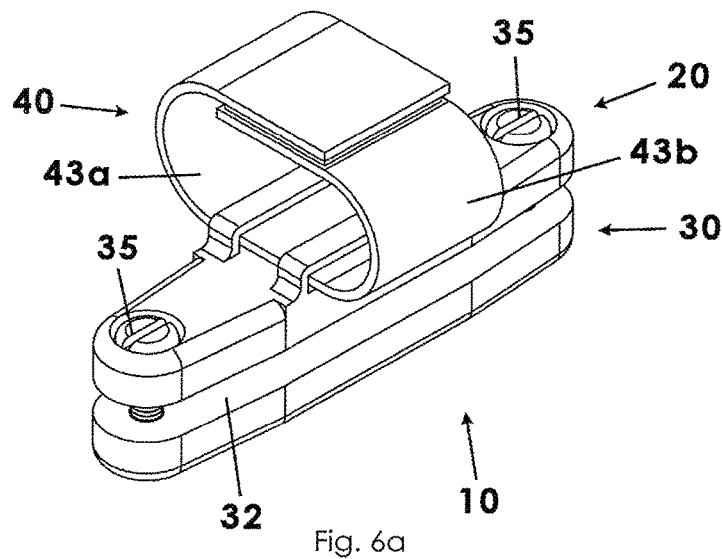
FIG. 6a is a perspective view of an apparatus for securing a backpack to a bicycle luggage rack according to another embodiment of the present invention, with a pair of straps of an attachment portion illustrated in a closed or coupled configuration.
Figure 6B:
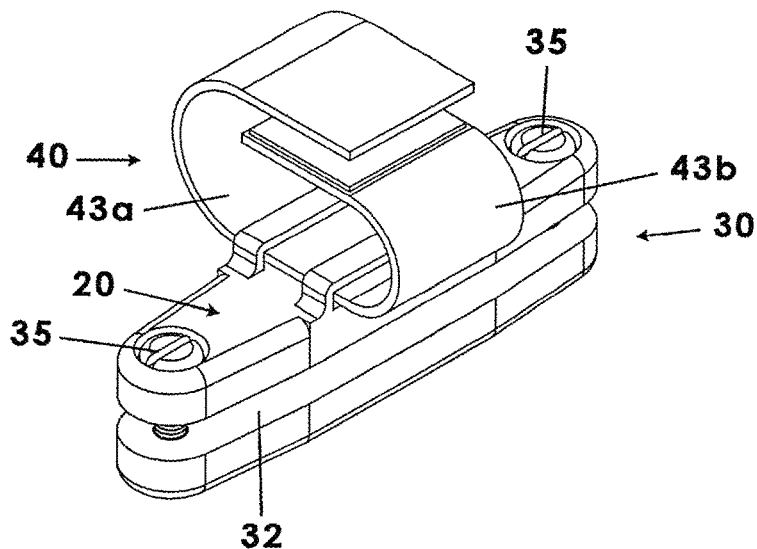
FIG. 6b is another perspective view of the apparatus as in FIG. 6a, illustrated with the straps in an open or released configuration.

An apparatus for securing a shoulder strap of a backpack to a bicycle luggage rack according to a preferred embodiment of the present invention will now be described with reference to FIG. 1 to 6b of the accompanying drawings. The apparatus 10 includes a first capture member 20, a second capture member 30, and a rack attachment member 40.

The first and second capture members 20, 30 are configured to face each other for essentially sandwiching and clamping an arm strap 5a of a backpack 5 therebetween. Accordingly, each capture member 20, 30 may include a flat bottom 22, 32, respectively, that is oriented to face a flat bottom of the other capture member. Again, the bottom walls 22, 32 are the flat walls that face one another. Each capture member 20, 30 includes a backside opposite its flat bottom. Further, each capture member 20, 30 may include an elongate and linear configuration and includes opposed ends that will be referred to as first member ends 20a and second member ends 30a. Preferably, the capture members have an equal length and are substantially mirror images of one another. Preferably, each first member end 20*a* defines an aperture 20*b* and each second member end 30*a* defines an aperture 30*b* such that the capture members may be coupled together with a pair of fasteners 35 extending between respective apertures, respectively, such as bolt/nut combinations or the like. Each aperture may include a threaded configuration having a pattern complementary to that of the pair of fasteners.

The capture members 20, 30 are movable relative to one another upon actuation of the fasteners 35 so as to selectively sandwich an arm strap 5*a* of the backpack 5 therebetween. More particularly, the pair of fasteners are threadably movable (i.e., rotatable) between a loosened configuration at which the first capture member 20 is slightly spaced apart from the second capture member 30 and a tightened configuration at which the capture members 20, 30 are compressed against one another in a friction fit relationship. In use, the capture members may be sufficiently loosened such that an arm strap 5*a* of a backpack 5 may be inserted therebetween and then the capture members may be tightened so as to be securely sandwiched therebetween. Once secured, the first and second capture members 20, 30 may be left in the tightened configuration such that the entire apparatus 10 becomes a semi-permanent fixture of the backpack 5.

In another critical aspect of the invention, the apparatus 10 includes an attachment member 40 having a configuration for quickly attaching the apparatus, including the backpack 5, to the luggage rack 110 mounted to a bicycle 100, moped, motorcycle, or the like. The attachment member 40 according to the present invention may include several variations in structure as will be described in more detail below.

In one construction, the first capture member 20 and the attachment number 40 have a unitary instruction such as would be the case if constructed from a singular mold. As shown, the attachment member 40 may be in the form of a clip 40*a* having a generally U-shaped configuration having one side that is closed and an opposed open end 40*e*, the open end 40*e* having a configuration that may be slidably clipped onto the luggage rack 110. Further, the clip 40*a* may include a first section 40*b* that is coplanar with the first capture member 20. In other words, the first section 40*b* and an upper surface of the first capture member 20 have a unitary construction, i.e., they share the same surface. Still further, the clip 40*a* may include a second section 40*c* that also has a planar surface and that is parallel to the first section 40*b*. In addition, a third section 40*d* has a rounded configuration that connects the first and second sections together, the third section 40*d* being opposite the open end 40*e*. Finally, the second section 40*c* of the clip 40*a* may include a grip edge 40*f* that is curved inwardly in the direction of the first capture member 20, the grip edge 40*f* providing additional friction and resistance to avoid unintended slippage or disengagement of the clip 40*a* from the luggage rack 110.

In a similar construction, the attachment member 40 and first capture member 20 may have separate and independent constructions but may be coupled together during manufacturing. More particularly, the attachment member 40 may include a base portion 41 that is fixedly attached or mounted to the backside of the first attachment member 20 and a clip 40*a* as described above may be coupled to the base portion 41. Further, the clip 40*a* may include multiple sections, open end, and grip edge as described above.

In a related construction, the attachment member 40 may include a first strap 43*a* and a second strap 43*b* separate and displaced from the first strap 43*a*, each strap having hook or loop material adhered to its surface, respectively. The straps have a flexible construction such that the straps may be wrapped or draped around the bicycle rack 110 and securely yet releasably coupled to one another so as to secure the apparatus 10 and backpack 5 to the bicycle rack 110.

Accordingly, the apparatus for securing a literal backpack to a bicycle luggage rack provides the ultimate convenience in transporting books and the like along with quick-connect convenience and semi-permanent attachment to the backpack itself.

It is understood that while certain forms of this invention have been illustrated and described, it is not limited thereto except insofar as such limitations are included in the following claims and allowable functional equivalents thereof.

The invention claimed is:

1. An apparatus for securing a backpack to a bicycle luggage rack, said apparatus comprising:
   a first capture member having an elongate, linear configuration and opposed first member ends;
   a second capture member having an elongate, linear configuration and opposed second member ends;
   wherein said second capture member is selectively coupled to said first capture member with a pair of fasteners extending between said opposed first member ends and said second member ends, respectively,
   said pair of fasteners being threadably movable between a loosened configuration at which said first capture member is displaced from said second capture member and a tightened configuration at which said first capture member is compressed against said second capture member;
   an attachment member fixedly attached to a backside of said first capture member and having a configuration for operative attachment to the bicycle luggage rack;
   wherein said first capture member and said attachment member have a unitary construction;
   wherein said attachment member is a clip having a U-shaped configuration defining an open end adjacent said first capture member;
   wherein said clip includes a first section coplanar with said first capture member and a second section displaced from and parallel to said first section and a third section having a rounded configuration connecting said first section to said second section opposite said open end.

2. The apparatus as in claim 1, wherein said second section includes a grip edge that is curved inwardly towards said first capture member.

3. The apparatus as in claim 1, wherein said attachment member includes a base portion fixedly attached to said backside of said first attachment member and a clip coupled to and extending away from said base portion.

4. The apparatus as in claim 3 wherein said clip includes a U-shaped configuration defining an open end adjacent said first capture member.

5. The apparatus as in claim 4, wherein said clip includes a grip edge that defining said open end and that is curved inwardly towards said first capture member.

6. The apparatus as in claim 1, wherein:
   said opposed first member ends and that opposed second member ends each define apertures having a threaded configuration; and
   said pair of fasteners each includes a bolt and nut combination extending between respective apertures.

7. An apparatus for securing a backpack to a bicycle luggage rack, said apparatus comprising:

a first capture member having an elongate, linear configuration and opposed first member ends;

a second capture member having an elongate, linear configuration and opposed second member ends;

wherein said second capture member is selectively coupled to said first capture member with a pair of fasteners extending between said opposed first member ends and said second member ends, respectively, said pair of fasteners being threadably movable between a loosened configuration at which said first capture member is displaced from said second capture member and a tightened configuration at which said first capture member is compressed against said second capture member;

an attachment member fixedly attached to a backside of said first capture member and having a configuration for operative attachment to the bicycle luggage rack;

wherein said attachment member includes a base portion fixedly attached to said backside of said first attachment member and a clip coupled to and extending away from said base portion;

wherein:

said clip includes a first strap coupled to and extending away from said base portion and being covered in a hook material and a second strap coupled to and extending away from said base portion being covered in a loop material, said first strap and said second strap each having a free end displaced from said base portion, respectively;

said first and second straps have a flexible configuration that are movable between an open configuration displaced from one another so as to wrap around the bicycle luggage rack and a closed configuration releasably coupled to one another so as to tether said clip to the bicycle luggage rack.

8. An apparatus for securing a shoulder strap of a backpack to a bicycle luggage rack, said apparatus comprising:

a first capture member having an elongate, linear configuration and having opposed first member ends each defining an aperture;

a second capture member having an elongate, linear configuration and opposed second member ends each defining an aperture;

wherein said second capture member is selectively coupled to said first capture member with a pair of fasteners extending between respective apertures of said opposed first member ends and said second member ends, respectively, said pair of fasteners being threadably movable between a loosened configuration at which said first capture member is displaced from said second capture member and a tightened configuration at which the shoulder strap of the backpack is sandwiched between said first capture member and said second capture member;

an attachment member fixedly attached to a backside of said first capture member and having a configuration for operative attachment to the bicycle luggage rack;

wherein said first capture member and said attachment member have a unitary construction;

said attachment member is a clip having a U-shaped configuration defining an open end adjacent said first capture member;

said clip includes a first section coplanar with said first capture member and a second section displaced from and parallel to said first section and a third section having a rounded configuration connecting said first section to said second section opposite said open end.

9. The apparatus as in claim 8, wherein said attachment member includes a base portion fixedly attached to said backside of said first attachment member and a clip coupled to and extending away from said base portion.

10. The apparatus as in claim 9 wherein said clip includes a U-shaped configuration defining an open end adjacent said first capture member.

11. The apparatus as in claim 10, wherein said clip includes a grip edge that defines said open end and that is curved inwardly towards said first capture member.

12. The apparatus as in claim 8, wherein said second planar section includes a grip edge that is curved inwardly towards said first capture member.

\* \* \* \* \*